United States Patent
Song et al.

(10) Patent No.: US 9,314,759 B2
(45) Date of Patent: Apr. 19, 2016

(54) APPARATUS AND METHOD FOR HYDROCONVERSION

(71) Applicants: Steven Xuqi Song, Albany, CA (US); Donald Leroy Kuehne, Hercules, CA (US); Abdenour Kemoun, Pleasant Hill, CA (US); Bruce Edward Reynolds, Martinez, CA (US)

(72) Inventors: Steven Xuqi Song, Albany, CA (US); Donald Leroy Kuehne, Hercules, CA (US); Abdenour Kemoun, Pleasant Hill, CA (US); Bruce Edward Reynolds, Martinez, CA (US)

(73) Assignee: CHEVRON U.S.A., INC., San Ramon, CA (US)

( * ) Notice: Subject to any disclaimer, the term of this patent is extended or adjusted under 35 U.S.C. 154(b) by 49 days.

(21) Appl. No.: 14/168,099

(22) Filed: Jan. 30, 2014

(65) Prior Publication Data

US 2014/0147352 A1 May 29, 2014

Related U.S. Application Data

(63) Continuation of application No. 13/162,742, filed on Jun. 17, 2011, now abandoned.

(51) Int. Cl.
*B01J 8/00* (2006.01)
*B01J 8/02* (2006.01)
*B01J 19/00* (2006.01)
(Continued)

(52) U.S. Cl.
CPC .. *B01J 8/06* (2013.01); *B01J 8/005* (2013.01); *B01J 8/007* (2013.01); *B01J 8/1827* (2013.01); *B01J 8/22* (2013.01); *B01J 8/226* (2013.01); *B01J 8/44* (2013.01); *C10G 45/02* (2013.01); *C10G 45/16* (2013.01); *C10G 45/22* (2013.01); *C10G 47/26* (2013.01); *C10G 49/12* (2013.01); *B01J 2208/00176* (2013.01); *B01J 2208/00929* (2013.01); *B01J 2208/025* (2013.01); *B01J 2208/026* (2013.01); *B01J 2219/0004* (2013.01)

(58) Field of Classification Search
CPC ............... B01J 8/00; B01J 19/00; B01J 19/24; B01J 19/30; B01J 19/305; B01J 2208/00796; B01J 2208/00884; B01J 2208/00893; B01J 2208/0092; B01J 2208/00922; C10G 45/00; C10G 47/00; C10G 49/00
See application file for complete search history.

(56) References Cited

U.S. PATENT DOCUMENTS

| 1,776,589 A | * | 9/1930 | Keith, Jr. ..................... 261/114.2 |
| 3,197,286 A | * | 7/1965 | Farkas .................... B01J 8/1827 208/108 |

(Continued)

OTHER PUBLICATIONS

U.S. Appl. No. 13/162,742, filed Jun. 17, 2011, Song, et al.

*Primary Examiner* — Natasha Young
(74) *Attorney, Agent, or Firm* — Parks IP Law LLC; Steve E. Ellinwood

(57) ABSTRACT

An apparatus is disclosed for the hydroconversion of hydrocarbon feedstock with a hydrogen gas at elevated temperature and pressure with the use of a catalyst. The apparatus is a reactor vessel with a grid plate distributor for improved gas liquid distribution. The distributor comprises a grid plate and a bubble cap assembly with a plurality of tubular risers extending through the grid plate. Each tubular riser has an upper section above the grid plate and a lower section below the grid plate, the lower section terminated with an open bottom end for ingress of the hydrogen gas and hydrocarbon feedstock, the upper section having a closed top terminated with a housing cap. Each tubular riser has at least a vertical slot and a least a laterally placed opening sufficiently sized such that in operation, the liquid level in the zone below the grid plate is above the vertical slot and below the laterally placed opening.

12 Claims, 3 Drawing Sheets

(51) Int. Cl.
  *B01J 19/24* (2006.01)
  *B01J 19/30* (2006.01)
  *B01J 8/06* (2006.01)
  *B01J 8/22* (2006.01)
  *B01J 8/44* (2006.01)
  *C10G 45/02* (2006.01)
  *C10G 45/16* (2006.01)
  *C10G 45/22* (2006.01)
  *C10G 47/26* (2006.01)
  *C10G 49/12* (2006.01)
  *B01J 8/18* (2006.01)
  *C10G 45/00* (2006.01)
  *C10G 47/00* (2006.01)
  *C01G 49/00* (2006.01)

(56) References Cited

U.S. PATENT DOCUMENTS

| | | | |
|---|---|---|---|
| 4,220,518 A | | 9/1980 | Uchida et al. |
| 4,400,263 A | | 8/1983 | Kydd et al. |
| 4,707,340 A | * | 11/1987 | Milligan ............... 422/140 |
| 4,715,996 A | * | 12/1987 | Lambousy et al. ...... 261/114.2 |
| 4,874,583 A | * | 10/1989 | Colvert ............... 422/143 |
| 4,886,644 A | | 12/1989 | Chan et al. |
| 7,121,537 B2 | * | 10/2006 | Boyer et al. ............ 261/96 |
| 7,370,847 B2 | * | 5/2008 | Kao et al. ............ 261/114.2 |
| 7,449,103 B2 | | 11/2008 | Lott et al. |
| 2007/0140927 A1 | | 6/2007 | Reynolds |
| 2009/0134064 A1 | | 5/2009 | Reynolds |

\* cited by examiner

ABSTRACT# APPARATUS AND METHOD FOR HYDROCONVERSION

CROSS-REFERENCE TO RELATED APPLICATION

This application is a continuation of pending U.S. application Ser. No. 13/162,742, filed Jun. 17, 2011.

FIELD OF THE INVENTION

The invention relates to a distributor assembly in reactors for hydroconversion processes, a reactor containing the distributor assembly, and methods for hydroconversion.

BACKGROUND OF THE INVENTION

"Heavy" hydrocarbon feed streams, particularly petroleum residua, tar sand bitumen, shale oil, etc., generally contain undesirable contaminants such as sulfur, nitrogen, metals and organo-metallic compounds. A hydroconversion process such as hydrotreatment to remove the undesirable components from hydrocarbon feed streams is a known method of catalytically treating heavy hydrocarbon feed to increase their commercial value. Another hydroconversion process is the Fischer-Tropsch (FT) process for preparing liquid hydrocarbons from fossil fuels, especially coal, by conversion to synthesis gas, followed by conversion to liquid hydrocarbons over a FT catalyst.

A catalytic reactor system that has been successfully used to convert coal or heavy hydrocarbon feedstock to lighter products is the ebullating bed reactor. An exemplary ebullating bed reactor is employed in the H-Coal process as described in U.S. Pat. No. 4,400,263; the H-Oil process for the hydrotreating of residuum as described in U.S. Pat. No. 4,526,676; the LC-Fining process also for the hydrotreating of residuum as described in U.S. Pat. No. 4,886,644. Another exemplary ebullating bed reactor system for the upgrade of heavy oil feedstock employing colloidal or molecular catalyst is described in U.S. Pat. No. 7,449,103. Other types of reactor system for use in hydroconversion include an internal circulating slurry reactor or a liquid recirculating reactor as described in U.S. Patent Publication Nos. 2007/0140927A1 and 2009/0134064A1, and a fluidized bed reactor as described in U.S. Pat. No. 4,220,518.

In some reactor systems indicated above, a grid plate (or distributor tray) divides the bottom section of the reactors into two zones. In operation, catalyst and coke agglomerations on the grid plate can cause large variations in reactor wall temperatures requiring shut-downs and reduce the duration of runs. Improved uniform distribution of gas and liquid flow through the grid plate is an important factor in optimizing reactor performance, minimizing the build-up of coke and catalyst on the grid plate and extending process run durations. There is a need for a reactor system with improved distribution design for uniform distribution of gas and liquid flow.

SUMMARY OF THE INVENTION

In one aspect, the invention relates to a reactor for the hydroconversion of hydrocarbon feedstock with a hydrogen gas at elevated temperature and pressure with the use of a catalyst, the reactor vessel contains a grid plate assembly comprising: a grid plate dividing the reactor into two zones, a zone above the grid plate and a zone below the grid plate; a bubble cap assembly comprising a plurality of tubular risers extending through the grid plate to transmit the hydrogen gas and hydrocarbon feedstock from the zone below the grid plate to the zone above the grid plate; each tubular riser having an upper section above the grid plate top and a lower section below the grid plate bottom, the lower section terminated with an open bottom end for ingress of the hydrogen gas and hydrocarbon feedstock, the upper section having a closed top terminated with a housing/bubble cap; the lower section of the tubular riser having at least a vertical slot extending from the open bottom end; and the lower section of the tubular riser having a least a laterally placed opening sufficiently sized and located such that in operation, liquid level in the zone below the grid plate is above the vertical slot and below the laterally placed opening. The tubular risers can be inserted or placed in the grid plate such that the vertical slot and the laterally placed opening in the lower end of the riser are at variable distances from the grid plate bottom in a manner to ensure that an inclined liquid surface level remains between the vertical slot and the laterally placed openings during operation of the reactor.

In one embodiment, the tubular riser is a double pipe riser, having an inner pipe and an outer pipe defining an annular opening between the inner pipe and the outer pipe as the open bottom end for ingress of the hydrogen gas and hydrocarbon feedstock, and the laterally placed opening is located on the outer pipe.

DETAILED DESCRIPTION

Figure 2B:
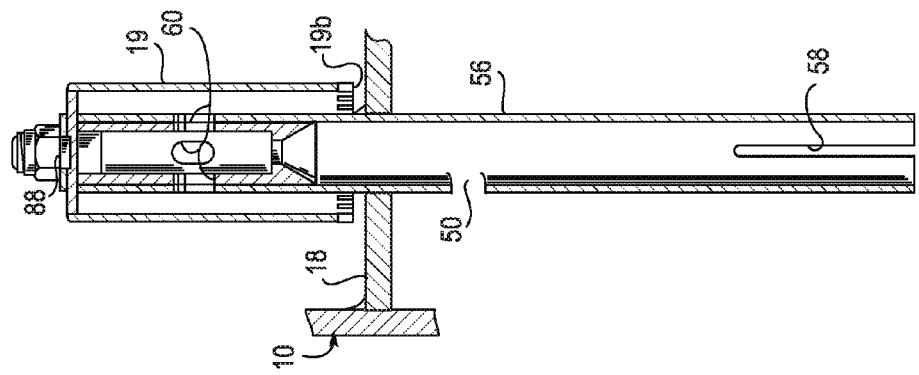
FIG. 2B is a cross-sectional view of a second embodiment of a bubble cap assembly.

In one embodiment, the invention is directed to an improved gas liquid distributing device, e.g., a grid plate, for use in high pressure reactor vessels for the hydroconversion of hydrocarbon feedstock. The improved gas liquid distributing device can be used for known reactors used in the H-Oil process, the LC-Fining process, the H-Coal process, the heavy oil upgrade process as well as others. As noted herein before, the use of these reactors is well-known in the art. It will be apparent to those skilled in the art that the embodiments described herein can have useful applications outside the scope of just ebullating bed reactors, slurry reactors, recirculating reactors, or fluidized bed reactor. They may be useful, individually or in combination, in other reactor types such as fixed bed reactors, polymerization reactors, and hydrogenation reactors, suitable for reacting liquids, liquid-solid slurries, solids and gases at elevated temperatures and pressures to treat hydrocarbon feed with hydrogen at high pressures and high temperatures, e.g. 100 to 5000 psi and 300 to 1800° F.

In one embodiment, the reactor vessel contains a perforated grid plate which is circumferentially connected to the reactor inner wall. The grid plate divides the bottom section of the reactor into two zones. The plate can be used to support an ebullating bed, a slurry bed, or a fixed bed of solid catalyst particles in the upper zone. The grid plate contains a plurality of bubble cap risers connected through the grid plate perforations for feed stream to flow through, forming an abundance of gas bubbles to pass into the upper zone, e.g., the catalyst bed or the slurry bed.

A number of risers (short pipes) extend downwardly from each grid plate hole, e.g., for about 8 to 24 inches depending on the size of the reactor vessel, below the underside of the grid plate. Each riser is provided with at least a vertical slot at the bottom of the riser pipe to help with the two-phase flow through the bubble cap. The slots are sized such that if a raising level of the oil surface should reach the bottom of the riser pipe, the vapor may still enter the riser via the slots. In one embodiment, the slots are sized to keep liquid level around the middle height of the slots. In one embodiment, the slots have a width ranging from $\frac{1}{8}$" to 1", with a vertical length ranging from 2" to 12". In another embodiment, the vertical length ranges from 4 to 6". In another embodiment, the slot has a vertical length ranging from $\frac{1}{8}$ to $\frac{1}{2}$ of the length of the riser below the distribution plate.

Gas fed into the reactor system, e.g., from a ring distributor or a sparger, will disengage in the bottom zone, accumulate underneath the distributor tray and form a gas pocket. In one embodiment with a slurry catalyst feed, slurry flows into the riser through the bottom open end and lower part of the slots. Excess gas will push the liquid level down and flows into the riser though top section of the slots. For a given gas rate, a steady state liquid level is established within the height of the slots. Flow distribution of gas passing through the distributor tray is sensitive to the levelness of the tray assembly. Even for a perfectly leveled tray, gas flow distribution would also be affected by varying liquid level.

In the reactor system, slurry is discharged radially outward from the downcomer pipe through an internal pump at the bottom of the column. The momentum of this slurry flow will push it toward the wall and cause higher slurry level close to the wall region. In one embodiment of a reactor system for heavy oil upgrade employing slurry catalyst, e.g., as disclosed in U.S. Publication Nos. 2007/0140927A1 and 2009/0134064A1, the relevant are included herein by reference, the reactor system is operated in bubbly regime and gas rate may not be sufficient high enough to push the liquid level stay at the middle of the slots. With operations having low gas rate, the slurry level will be high enough in the wall region to fully cover the slots on risers and leave only the slots in the middle of the column to be exposed to gas pocket. As a result, only bubble caps in the middle of the column will have gas flowing through, and bubble caps close to the wall will mainly have slurry and very small amount or no gas flowing through them. Slots on bubble caps on one side of the column with higher liquid level can be completely submerged in liquid. Consequentially, there may be no gas flow through these bubble caps. Under high temperature operations, this will lead to coke formation in the bubble caps close to the wall, eventually cause plugging and de-fluidization in this region.

In the improved reactor system, the riser section below the distributor plate has at least a laterally placed opening for gas flow into each riser. The laterally placed opening can be of different geometric shapes, e.g., circular or elliptical. In one embodiment, the laterally placed opening is on one side of each riser. In a second embodiment, there are laterally placed openings on both sides of each riser. In a third embodiment, the plurality of laterally placed openings are spaced equidistant around the circumference of the riser. In a fourth embodiment, a plurality of laterally placed openings along a vertical length of the riser in a row from top to bottom with the holes being of equal or different sizes from top to bottom of the row of laterally placed openings.

In one embodiment, (top of) the (top-most) laterally placed opening is located from 1 to 5" from the distributor plate bottom. In another embodiment, (top of) the (top-most) laterally placed opening is located at least 2" from the distribute plate.

The laterally placed opening is one embodiment is of equal size for all risers. In another embodiment, the laterally placed openings are sized differently depending on the location of the risers on the distribution plate. The laterally placed opening in one embodiment is sufficiently sized to maintain the slurry level between the hole and the slot(s). In one embodiment, the hole has a diameter ranging from $\frac{1}{16}$ to $\frac{1}{2}$ of the diameter of the riser opening (diameter of the riser tube). In another embodiment, the laterally placed opening has a diameter (or the shortest dimension for an elliptical opening) ranging from $\frac{1}{16}$" to 1" opening, depending on the size of the equipment in operation. In one embodiment, the laterally placed opening ranges from $\frac{1}{8}$ to $\frac{1}{2}$" in diameter.

Laterally placed openings can be sized using pressure balance models, spread sheet design tools, and computational fluid dynamic model packages known in the art such as FLUENT, taking into account factors including but not limited to riser diameter, particle size and density, flow characteristics, fluid properties, gas and liquid and/or slurry flux, etc. The improved riser design with slot(s) and laterally placed opening(s) allow flexible operations with respect to gas rate, with gas flow distribution being independent of varying liquid level, allowing uniform gas distribution with tolerance to distributor tray being out-of-level. When the operation is run at a higher gas rate than design specifications, it is anticipated that gas pocket will push liquid level lower to allow extra gas flowing through the slots on the riser, while still maintaining gas flow across the section.

In one embodiment of an ebullated bed to prevent catalyst back flow to the bottom section of the reactor (plenum), the riser section above the grid plate has a check valve section to restrict the fluid flow within. In one embodiment, the check valve comprises a ball check valve with a ball and a valve seat. In another embodiment of the improved reactor system, fluid is allowed to flow unobstructed in the rise, i.e., without moving parts such as check valves or steel balls in the riser. In place of the check valve, in one embodiment the bubble cap riser is provided with a constriction, e.g., a venturi or throat nozzle which enhances mixing in the bubble cap riser with the constricted opening. The constriction can be sized to avoid foaming formation from the high shear two-phase flow, taking into account factors such as fluid properties and operating conditions.

Figure 1:
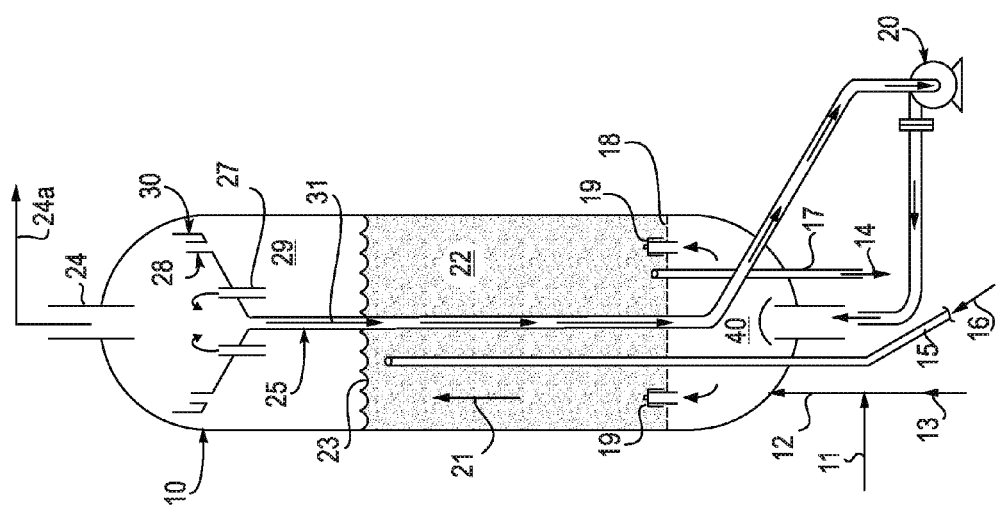
FIG. 1 is an elevated view of a reactor system employing an embodiment of the improved gas liquid distribution device, the reactor system employing an external ebullating pump.

Reference is made to FIG. 1, which illustrates a reactor vessel with an improved gas liquid distribution profile. Reaction vessel 10 is fitted with an inlet conduit 12 for feeding heavy oil and a hydrogen-containing gas. Outlet conduit 24 is designed to withdraw vapor and liquid through line 24a. Entry conduit 15 is for fresh catalyst feed 16, and exit conduit 17 is for the withdrawal of spent catalyst 14. Heavy oil feedstock is introduced through line 11, while hydrogen-containing gas is introduced through line 13. The two feeds may be combined and introduced via line 12 in the bottom of the reactor. The feed passes through distributor plate 18 containing bubble caps 19 which distribute the fluids from a lower chamber 40, which may be a plenum chamber, into bed 22.

The mixture of liquid and gas flows upwardly, and the catalyst particles are thereby forced into an ebullated movement by the gas flow and the liquid flow delivered by recycle pump 20 which may be either internal or external to the reactor 10. The upward liquid flow delivered by this recycle pump is sufficient to cause the mass of catalyst particles in bed 22 to expand, thus permitting gas and liquid flow as shown by direction arrow 21 through reactor 10.

Due to the upwardly directed flow provided by the pump and the downward forces provided by gravity, the catalyst bed particles reach an upward level of travel or ebullation while the lighter liquid and gas continue to move upward beyond that level. The upper level of catalyst or catalyst-liquid interface is shown as 23, and the catalytic reaction zone extends from the top surface (FIG. 2A, 101) of the transverse distributor plate 18 to level 23. At steady state, few catalyst particles rise above catalyst-liquid interface 23. The volume 29 above the interface 23 is filled with liquid and entrained gas or vapor. Gas and vapor are separated from liquid in the recycle cup 30, and a liquid with a substantially reduced gas and vapor content is recycled through downcomer 25. Gases, vapors, and liquid product are withdrawn together through conduit 24. In one embodiment, a plurality of vertically directed conduits 27 and 28 provides fluid communication between the reaction zone and recycle cup 30. Gas-entrained fluid moves upwardly through the conduits 27 and 28, and upon leaving the upper ends of these conduits, part of the fluid 31 reverses direction and flows downward to and through recycle conduit 25 to recycle pump 20 and thereby is recycled through the lower portion of reactor 10.

Figure 2A:
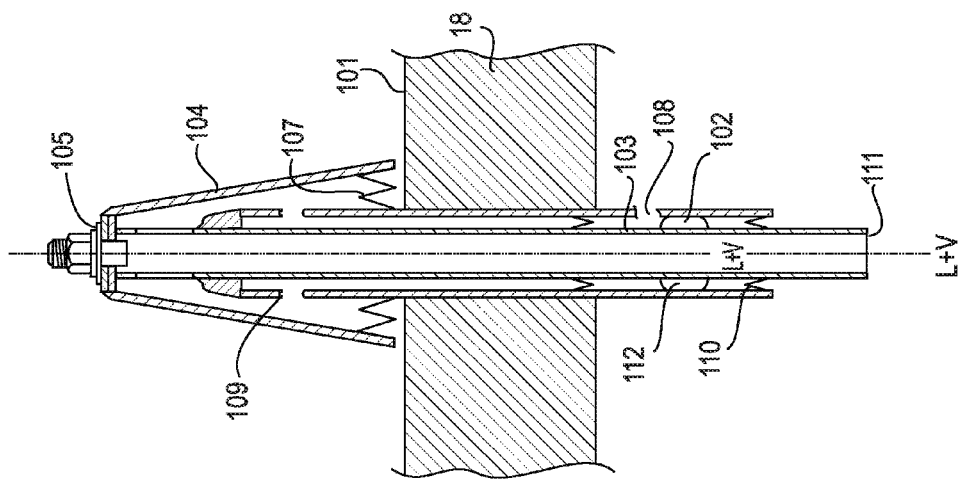
FIG. 2A is a cross-sectional view of an embodiment of a bubble cap assembly.

FIG. 2A illustrates a vertical section through one embodiment of the bubble cap assembly for improved gas slurry distribution. The bubble cap assembly in this embodiment is of a double pipe riser type, i.e., having an outer pipe 102 and inner pipe 103 defining an annular opening for ingress of hydrogen gas and hydrocarbon feedstock, supporting a bell cap 104 with the top 105 of the inner pipe 103. The cap housing 104 is bell shaped with tapered wall. The bottom edge 107 of the bell cap can be notched or serrated into saw-tooth triangle. The top edge of the outer pipe (102) terminates within the bell housing (104) below the slotted openings (106) in the top of the inner pipe (103). Outer pipe (102) also contains openings (109) at the top. The top openings in the inner pipe (106) and the top openings in the outer pipe (109) are in fluid communication with the bell housing (104) interior space. The bottom edge of the outer pipe 102 terminates at 110, in communication with the vapor space below the grid space. The bottom edge 111 of the inner inside pipe 103 submerges under the liquid below the grid plate. A plurality of spacers 112 are located between the inner 103 and outer 102 pipes. There is at least a side hole (opening) 108 on the outer pipe 102 for gas flow. In one embodiment (not shown), the outer pipe 102 comprises at least a vertical slot extending up from the open bottom section of the pipe to allow for the passage of gas flowing upward through the annular opening between the inner pipe and the outer pipe.

Reference is made to FIG. 2B, which illustrates a vertical section through a second embodiment of the bubble cap assembly. The cap housing in this embodiment is tubular in shape. Riser 56 comprises a fluid outlet port 60 providing fluid communication between the lower chamber 40 and catalyst bed 22. The bubble caps 19 are fastened to the riser 56 by fastening means 88 such as welds, washers, bolts and nuts or combination thereof in such a fashion such that the lower edge 19b of bubble cap 19 is located above the distributor plate 18. Riser 56 comprises at least a slot 58 positioned to allow for the passage of gas under plate 18 into the riser 56. There is at least a side hole (opening) 50 above slot 58 and within riser 56 for gas flow.

Figure 3:
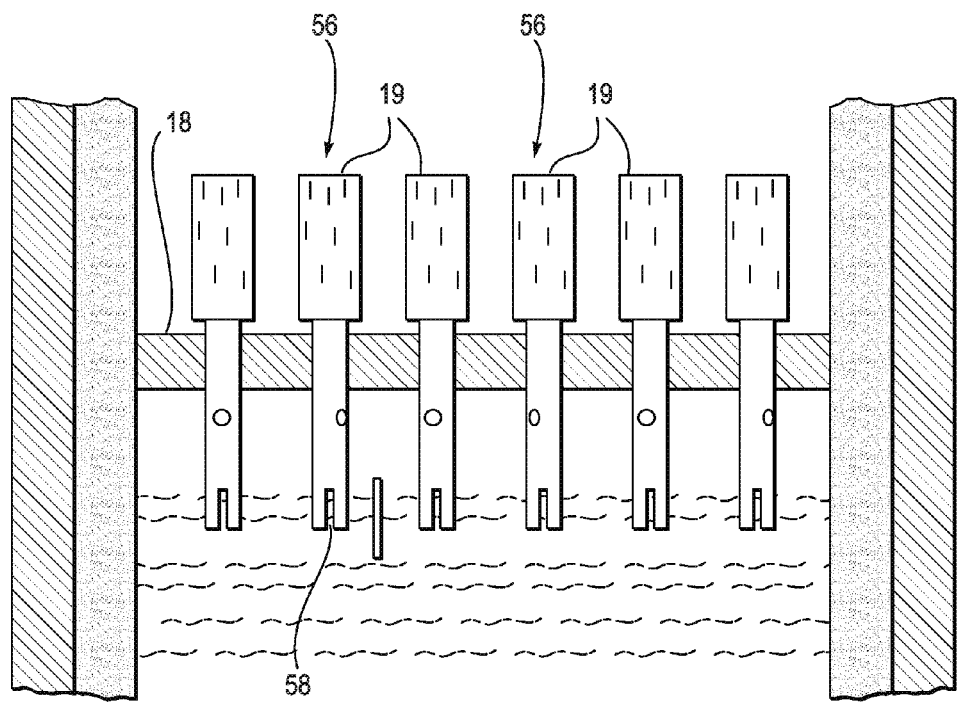
FIG. 3 is an exploded perspective view of the fragment of the reactor vessel in FIG. 1, illustrating one embodiment of the grid plate with bubble cap risers.

FIG. 3 is an exploded perspective view of an embodiment of the grid plate 18 and bubble cap assemblies of FIGS. 1 and 2B for improved gas slurry distribution.

Figure 4:
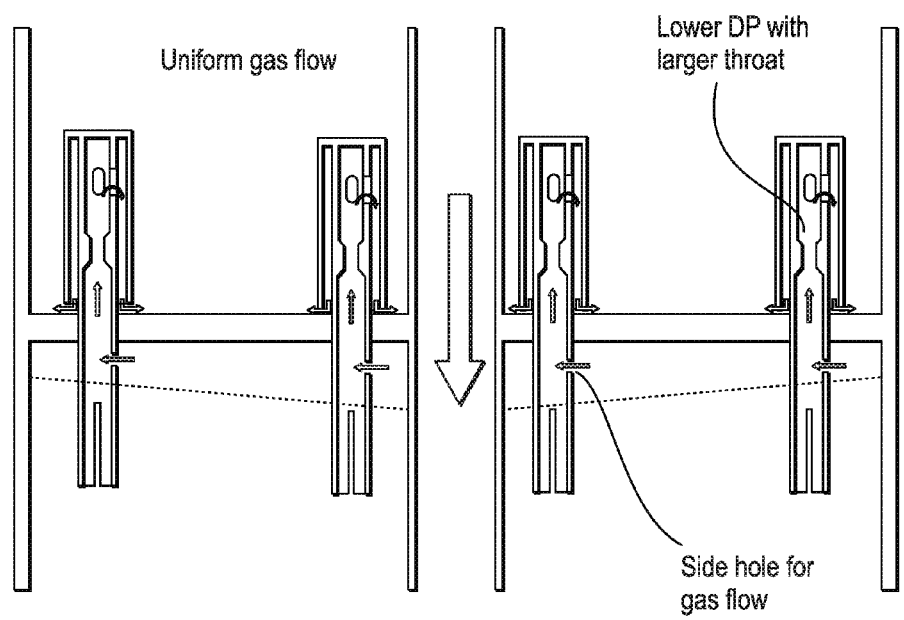
FIG. 4 is a schematic diagram illustrating the flow distribution through a bubble cap assembly.

FIG. 4 is a schematic diagram illustrating the flow distribution through the bubble cap assembly of FIG. 2a, based on experiments in a large scale cold flow unit with 4 feet diameter column wherein water/air/sand are used to mimic oil/hydrogen/catalyst in a commercial reactor system. As shown in the diagram, uniform distribution of gas flow is achieved through pressure drop ("DP") control across laterally placed openings on the riser. In the experiments, the cold flow unit is operated with solid concentration of 0-12%, the solid being fine silica sand having average particle size of 6 microns. The grid plate has a total of 72 bubble caps with cap OD of 3". In one experiment, a stainless steel ball is installed in the bubble cap to prevent back flow of catalyst slurry as taught in the prior art, which generates unwanted vibration with high velocity slurry and gas mixture flows through the throat supporting the ball. In a second experiment, the ball is removed and the throat is resized.

Figure 5:
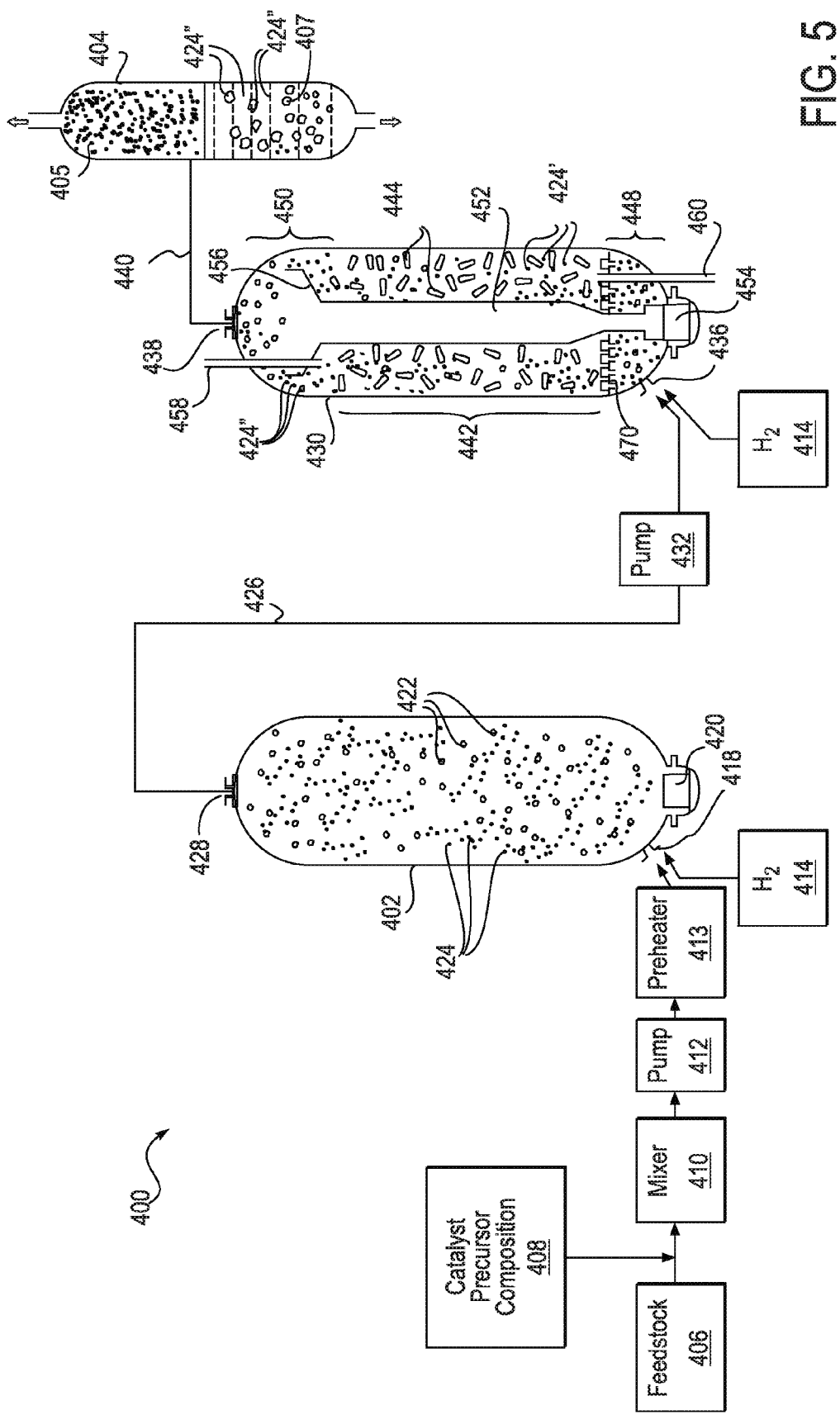
FIG. 5 is a schematic diagram of a hydroconversion system that employs a slurry phase reactor, an ebullated bed reactor having an internal ebullating pump, and a hot separator, with the improved gas liquid distributing device employed in either or both reactors.

FIG. 5 illustrates an exemplary ebullated bed hydroprocessing reactor system 400 incorporating the improved grid plate design. Ebullated bed hydroprocessing system 400 includes a slurry phase hydrocracking reactor 402, a hot separator 404, and an ebullated bed reactor 430 disposed between the slurry phase reactor 402 and the hot separator 404. A heavy oil feedstock 406 is initially blended and conditioned with a catalyst composition 408. The conditioned feedstock from the mixer 410 is pressurized by a pump 412, passed through a pre-heater 413, and continuously or periodically fed into the slurry phase reactor 402 together with hydrogen gas 414 through port 418 located at or near the bottom of the slurry phase reactor 402. A stirrer 420 at the bottom of the slurry phase reactor 402 helps to more evenly disperse the hydrogen 414, schematically depicted as gas bubbles 422, within the feedstock 406.

Alternatively or in addition to the stirrer 420, the slurry phase reactor 402 may include a recycle channel, recycling pump, and the improved distributor grid plate (not shown) to promote more even dispersion of reactants, catalyst, and heat. The colloidal or molecular catalyst within the feedstock 406 is schematically depicted as catalyst particles 424. It will be appreciated that gas bubbles 422 and catalyst particles 424 are shown oversized so that they may be seen in the drawing. In reality, they are likely invisible to the naked eye.

The heavy oil feedstock 406 is catalytically upgraded in the presence of the hydrogen and colloidal or molecular catalyst within the slurry phase reactor 402 to form an upgraded feedstock 426, which is continuously withdrawn along with residual hydrogen and from the slurry phase reactor 402 through an output port 428 located at or near the top of the slurry phase reactor 402. The upgraded feedstock 426 is optionally pressurized by pump 432 and introduced together with supplemental hydrogen 414 into the ebullated bed reactor 430 through an input port 436 located at or near the bottom of the ebullated bed reactor 430. The upgraded feedstock 426 contains also contains hydrogen and slurry catalyst or molecular (colloidal) catalyst, schematically depicted as catalyst particles 424' within the ebullated bed reactor 430 and 424" in the upper section of the reactor 430. The ebullated bed reactor 430 with the improved distributor grid plate 470 also includes an output port 438 at or near the top of the ebullated bed reactor 430 through which a further hydroprocessed feedstock 440 is withdrawn.

In one embodiment, the expanded catalyst zone 442 above the distributor grid plate 470 further comprises a porous supported catalyst 444. In another embodiment, the hydroconversion is carried out with slurry catalyst or molecular catalyst only. The catalyst free zone 448 is located below the distributor grid plate 470. The upper supported catalyst free zone 450 is located above the expanded catalyst zone 442. Slurry catalyst or molecular catalyst 424 is dispersed throughout the feedstock within the ebullated bed reactor 430, including both the expanded catalyst zone 442 and the supported catalyst free zones 448, 450, 452, thereby being available to promote upgrading reactions within what constitute catalyst free zones in conventional ebullated bed reactors. Feedstock within the ebullated bed reactor 430 is continuously recirculated from the upper supported catalyst free zone 450 to the lower supported catalyst free zone 448 by means of a recycling channel 452 in communication with an ebullating pump 454. At the top of the recycling channel 452 is a funnel-shaped recycle cup 456 through which feedstock is drawn from the upper supported catalyst free zone 450. The recycled feedstock is blended with fresh upgraded feedstock 426 and supplemental hydrogen gas 434.

In one embodiment with the use of supported catalyst, fresh supported catalyst 444 is introduced into the ebullated bed reactor 430 reactor through a catalyst input tube 458, and spent supported catalyst 444 is withdrawn through a catalyst withdrawal tube 460. The hydroprocessed feedstock 440 withdrawn from the ebullated bed reactor 430 is introduced into the hot separator 404, wherein the volatile fraction 405 is withdrawn from the top of hot separator 404, and the non-volatile fraction 407 containing catalyst particles 424" is withdrawn from the bottom of hot separator 404.

For purposes of this specification and appended claims, unless otherwise indicated, all numbers expressing quantities, percentages or proportions, and other numerical values used in the specification and claims, are to be understood as being modified in all instances by the term "about." It is noted that, as used in this specification and the appended claims, the singular forms "a," "an," and "the," include plural references unless expressly and unequivocally limited to one referent. The use of "including," "comprising," or "having," "containing," "involving," and variations thereof herein, is meant to encompass the items listed thereafter and equivalents thereof as well as additional items.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A grid plate assembly for use in a hydroconversion reactor, comprising:
   a grid plate having a top and a bottom dividing the hydroconversion reactor into a zone above the grid plate top and a zone below the grid plate bottom;
   a plurality of tubular risers extending through the grid plate;
   wherein each tubular riser comprises an upper section extending above the grid plate top and closed with a bubble cap and a lower section extending below the grid plate bottom and having an open end, at least one laterally placed vertical slot and at least one laterally placed opening,
   wherein the at least one laterally placed vertical slot and the at least one laterally placed opening in each tubular riser are positioned at variable distances from the grid plate bottom such that an inclined liquid level in the zone below the grid plate bottom is maintained between the laterally placed vertical slot and the at least one laterally placed opening,
   wherein the at least one laterally placed vertical slot extends from the open end of the lower section for a length ranging from $1/8$ to $1/2$ of the length of the lower section, and
   wherein the laterally placed opening is located from 1 to 5" below the grid plate bottom with a shortest dimension ranging from $1/16$ to $1/2$ of a diameter of the open bottom end of the tubular riser.

2. The grid plate assembly of claim 1, wherein the laterally placed opening in each tubular riser has a shortest dimension ranging from $1/8$ to $1/2$".

3. The grid plate assembly of claim 1, wherein the upper section of each tubular riser comprises a constriction for gas liquid mixing in the tubular riser.

4. The grid plate assembly of claim 3, further comprising a check valve located above the constriction in the upper section of each tubular riser.

5. The grid plate assembly of claim 4, wherein the check valve in each tubular riser comprises a steel ball and a valve seat.

6. The grid plate assembly of claim 1, wherein the bubble cap is tubular in shape.

7. The grid plate assembly of claim 1, wherein the bubble cap is bell shaped.

8. The grid plate assembly of claim 1, wherein each tubular riser has a plurality of laterally placed openings of equal or different sizes.

9. The grid plate assembly of claim 1, wherein each tubular riser has a plurality of laterally placed openings spaced along a vertical length of the riser.

10. The grid plate assembly of claim 1, wherein the tubular riser has a plurality of laterally placed openings spaced equidistant circumferentially about the riser.

11. The grid plate assembly of claim 1, wherein each tubular riser comprises an inner pipe and an outer pipe defining an annular opening between the inner pipe and the outer pipe as the open bottom end for ingress of hydrogen gas and hydrocarbon feedstock.

12. The grid plate assembly of claim 1, wherein the plurality of tubular risers each having at least a laterally placed opening with at least two tubular risers having laterally placed openings of different sizes.

\* \* \* \* \*